Jan. 21, 1969  A. J. FLOCCHINI  3,422,571
LIVESTOCK CONTROL GATE
Filed Jan. 24, 1967
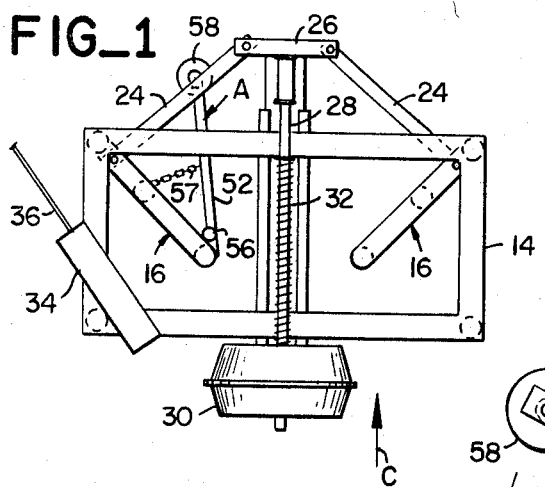
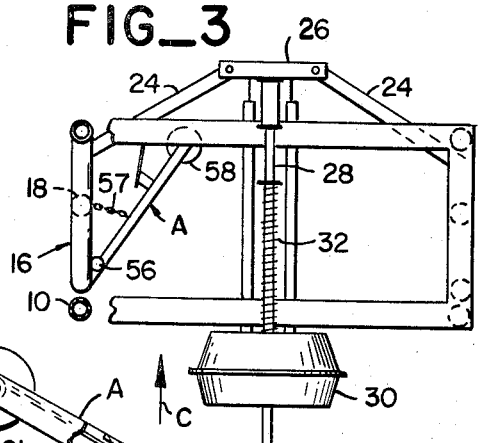
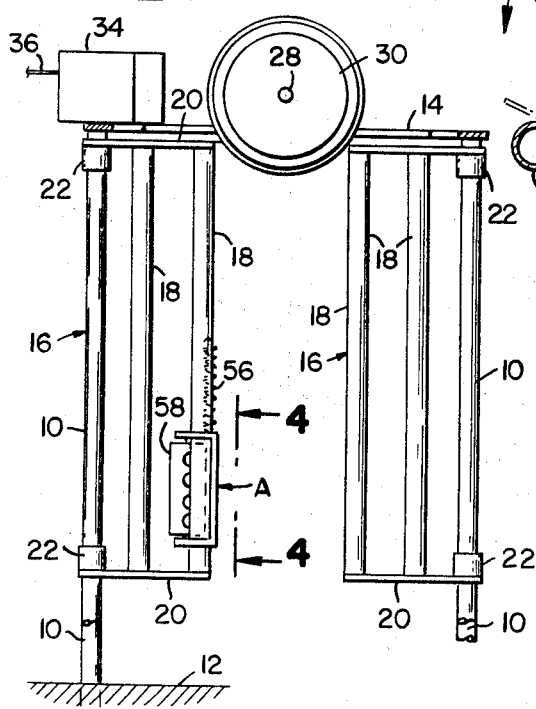
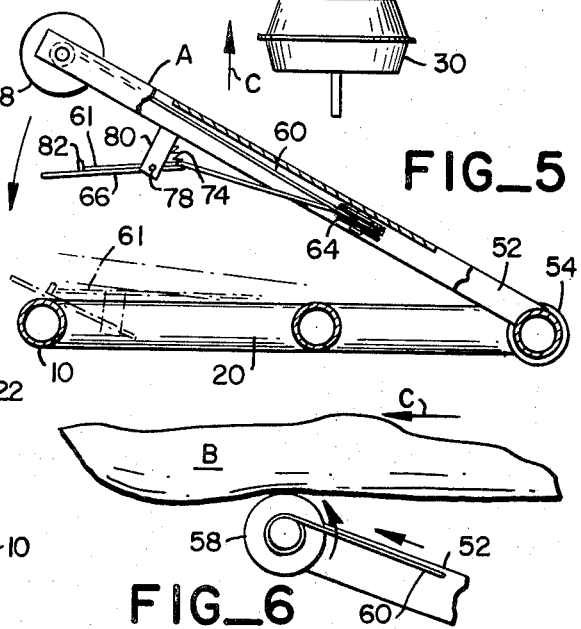
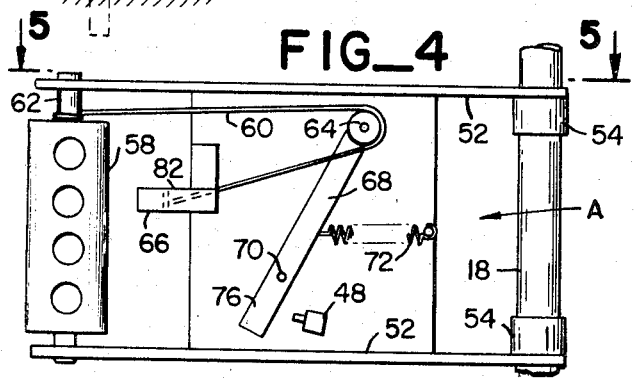
INVENTOR.
ANDREW J. FLOCCHINI
BY
*Townsend and Townsend*
ATTORNEYS > United States Patent Office 3,422,571
Patented Jan. 21, 1969

3,422,571
LIVESTOCK CONTROL GATE
Andrew J. Flocchini, 7078 Lakeville Highway,
Petaluma, Calif. 94952
Filed Jan. 24, 1967, Ser. No. 611,444
U.S. Cl. 49—31                                    5 Claims
Int. Cl. E05f 15/20

ABSTRACT OF THE DISCLOSURE

A livestock control gate having a sensing arm mounted on the gate to physically contact the animal passing through the gate opening, the arm having a roller at one end to contact the side of the animal and a cable which is rolled up by the roller to actuate a switch which closes the gate.

Background of the invention

This invention relates to control gates for livestock and, more particularly, to gates which are opened by the operator but which close automatically after an animal has passed through the gate.

In the prior art devices of which I have knowledge, livestock control gates are usually manually controlled, or, if the gate is automatically closed after passage of the animal through the gate, a long alley or passageway is required inside the gate so that the trip mechanism for closing the gate will be actuated only after the animal has cleared the gate itself.

Other prior art devices of which I have knowledge have their release mechanisms actuated as soon as an animal enters the open gate. The side of the animal then holds the gate open against the spring pressure which attempts to close the gate. The constant pressure of the metal parts upon the sides of the animals passing through the gate causes their skins to become bruised and thick with callouses. This results in reducing the milk production of such animals.

Summary of the invention

My invention comprises a livestock control gate having at least one closure member pivotally mounted in an opening, means for opening the closure member to permit an animal to enter the opening, and control means for maintaining the closure member in an open position during the time that the animal is passing through the opening and for closing the closure member when the animal has cleared the opening. It is an object of the invention to provide a novel means for controlling the entrance of livestock into a service area without the necessity of a human operator controlling the closing of the gate.

The control means for maintaining the closure member or gate in the open position comprises a sensing arm pivotally mounted on the closure and having a roller rotatably mounted on the end thereof which bears against the side of an animal or other object passing through the open gate. As the animal moves forward, the roller is turned by its frictional engagement with the side of the animal. The rolling action causes a cable to wind up on the roller axle which in turn actuates a switch to disconnect the power source and permit the gate to close. By proper adjustment of the cable, the gate-closing switch will be actuated only after the animal has passed through the open gate.

Should the animal passing through the gate back up, as they occasionally do, the cable will unwind from the roller axle thus precluding actuation of the gate-closing switch. A feature and advantage of the provision of the roller arrangement is to control the entrance of animals or other objects to an enclosure without the necessity of providing an elongated passageway which is required if the gate-closing switch is to be actuated by the animal after it has passed beyond the gate.

Still another feature and advantage of the invention is the provision of means responsive to movement of the control or sensing arm, the function of which is to effectively elongate the cable connecting the roller and the switch in order to compensate for larger animals passing through the gate. A larger animal will be both wider and longer and will cause the roller to turn more as the animal enters the open gate. This will require a somewhat longer cable in order to delay the actuation of the closing switch until the larger animal has passed through the gate. A provision incorporated in the control arm accomplishes this by being moved when the sensing arm is moved by the wider animal. When the means responsive to the movement of the sensing arm is in turn moved, the effective length of the cable connection is increased thus permitting more turning of the roller when the larger animal passes through the gate.

Other objects and advantages of the present invention will become apparent upon reading the following specifications and referring to the accompanying drawings in which corresponding numerals represent corresponding parts in each of the several views.

Brief description of the drawing

In the drawing FIG. 1 is a top plan view of the cattle gate;

FIG. 2 is a front elevation of the gate;

FIG. 3 is a partially cut away top plan view showing the gate in the open position;

FIG. 4 is an enlarged front elevation of the sensing arm and its switch arrangement, taken along the line 4—4 of FIG. 2;

FIG. 5 is an enlarged top plan view of the sensing arm;

FIG. 6 is an enlarged top view of the roller of the sensing arm pressing against the side of an animal; and FIG. 7 is a diagram of the control circuit for the gate.

Description of the preferred embodiment

Referring now more particularly to the drawing, the gate assembly is shown generally in FIG. 1 in top plan view. The frame of the gate is made of upright posts 10 which are embedded in the floor 12 and which are rigidly joined across their upper ends by head members 14. Pivotally mounted on the inner corner posts are the gates 16. Each gate comprises a pair of columns 18 rigidly joined top and bottom to frame members 20. The ends of the frame members are rigidly affixed to journals 22. These journals are mounted on the corner post to permit the gate to pivot freely as will be described herein. The upper frame members of each gate are connected by link 24 to the actuating bar 26. The actuating bar is in turn affixed to the end of plunger 28. The plunger is part of the power mechanism, in this case a vacuum cylinder 30. The plunger 28 is spring-loaded by compression spring 32 so that in the power-off position the gates are held in the closed position shown in FIG. 1.

When the operator desires to have an animal pass into the service area, he actuates the control circuitry which is enclosed in the control box 34. The controls are illustrated in diagrammatic form in FIG. 7; their operation will be described hereinafter.

The control circuitry may be actuated by means of a switch cord 36 which leads from the control box 34 to the service area. A switch cord is extremely convenient in that it extends the length of the service area and thus may be reached by the operator from any one of several service positions within the service area.

The switch cord 36 is connected to and closes a normally open switch 38. When the switch is closed, the double pole relay 40 is energized. One of the relay poles energizes a solenoid-operated vacuum control valve 46 in order to connect vacuum cylinder 30 to a vacuum pump (not shown). The other relay pole 44 is part of a holding circuit which is designed to keep the relay 40 energized until the circuit is interrupted by normally closed switch 48 which is part of the animal sensing arm assembly A which will be described hereinafter. The circuit is also provided with closing switch 50 to permit the operator to deenergize the relay 40 and close the gate should that become necessary.

When the operator pulls the switch cord 36, the solenoid valve 46 is opened and connects the vacuum supply to the vacuum cylinder. The plunger 28 is pulled towards the cylinder 30. The force on the plunger is transmitted through the actuating bar 26 and the links 24 to the gates 16 causing the gates to swing to the open position shown in FIG. 3.

When the gates 16 are in the full open position, the animal sensing arm assembly A assumes the position shown in FIG. 3 extending into the gate opening.

The arm assembly A comprises a pair of arms 52 affixed to journals 54 which permit the assembly to freely swing on the column 18 upon which the arm is mounted. A torsion spring 56 is affixed to one of the arms 52 and to the column 18 and is so disposed as to maintain the assembly A in position extended away from the gate 16. A chain 57 or similar restraining arrangement is affixed between the gate 16 and the assembly A to hold the arm in a preselected position inside the gate opening when the gates are open.

At the ends of the arm 52 a roller 58 is rotatably mounted. A flexible cable or chain 60 is affixed at one end to the axle 62 to which the roller 58 is fastened. The cable 60 passes around a pulley 64 and is affixed at its other end 61 to adjustment arm 66. Pulley 64 is rotatably mounted at one end of switch lever 68 which lever is pivotally mounted at point 70. An extension spring 72 maintains the switch lever 68 in the position shown in FIG. 4. Another extension spring 74 maintains the adjustment arm 66 in its position, as shown in FIG. 5.

When the operator opens the gates 16 to permit an animal to enter the service area, the sensing arm assembly A swings with the gate to which it is affixed, assuming the position in the opening as shown in FIG. 3. As one of the animals, a cow B for example, passes into the gate opening in the direction indicated by arrow C, the roller 58 presses against its side through the pressure exerted by spring 56. The movement of the cow causes the roller 58 to turn and wind the cable 60 upon the axle 62. This in turn shortens the cable and causes the switch lever to rotate about axle 70 until one end 76 of the lever contacts switch 48 described above in connection with the electrical circuitry. The lever causes switch 48 to open, breaking the holding circuit, de-energizing relay 40, and thus closing solenoid valve 46 and cutting off the vacuum supply. This in turn will permit spring 32 to return the gates to their closed position.

The position of switch lever 68 is preselected so that switch 48 will not be actuated until the cow B has passed completely through the gate opening. The preselected position is set for the average animal passing through the gate. A larger animal will be both wider and longer. When a large animal passes through the gate, the arm assembly A will be forced by the animal into a position close to the gate, as shown by the partial dashed lines in FIG. 5. In such case, as shown clearly in FIG. 5, adjustment arm 66 will contact the post 10 shown in section in this drawing. The arm 66 will be rotated about the pivot 78 upon which it is mounted on bracket 80. As arm 66 rotates, fastening point 82, to which the end 61 of the cable 60 is affixed will move and as it moves, cause cable 60 to effectively lengthen. As a result roller 58 will be required to turn more in order to actuate switch 48 through the sequence heretofore described, thus automatically accommodating the larger animal passing through the gate.

The switch arrangement described above also accommodates the occasional recalcitrant animal which enters the gate and then decides to reverse its direction. Should a cow back up after entering the gate, the roller 58 will reverse and permit the cable 60 to unwind from axle 62. The action of spring 72 makes certain that there will be positive unwinding of the cable 60 from the axle 62.

Although the foregoing invention has been described in some detail by way of illustration and example for purposes of clarity of understanding, it is understood that certain changes and modifications may be practiced within the spirit of the invention as limited only by the scope of the appended claims.

I claim:

1. Apparatus for controlling the movement of a gate comprising: an arm pivotally mounted on the gate and adapted for pivotal movement about one end thereof between a first position and a second position; rotatable means mounted on the arm and spaced from said one end; a control switch connected to the rotatable means; means responsive to rotation of the rotatable means to actuate the switch, and power means controlled by the switch for moving the gate so that when the rotatable means is rotated the switch is actuated and the gate is moved.

2. The apparatus of claim 1 and means responsive to movement of the arm from the first position to the second position to cause the means responsive to the rotation of the rotatable means to delay actuation of the switch.

3. The apparatus of claim 2 and wherein the means responsive to rotation of the rotatable means comprises an elongated flexible connector and the means responsive to the movement of the arm comprises an adjusting arm movable between a first position and a second position and to which one end of the flexible connector is attached, spring means urging the adjusting arm into the first position, a pivotally-mounted actuating lever, and a sheave mounted on the lever and disposed so that the flexible connector passes over the sheave.

4. A livestock control gate comprising: a frame defining an opening; at least one closure member mounted in said opening for movement between a closed position and an open position; motive means coupled with said closure member for moving the closure member between the closed position and the open position; first control means connected to the motive means for controlling the opening of the closure member; and second control means connected to the motive means for controlling the closing of the closure after an animal has passed through the opening; said second control means comprising a movable arm, a rotatable sensing means carried on the arm and disposed to bear against the side of an animal passing through the opening, a switch, an elongate flexible connection between the rotatable sensing means and the switch for actuating the switch when the rotatable sensing means is rotated by movement of an animal through the opening, and means associated with the flexible connection for increasing its effective length responsive to the movement of the movable arm.

5. A livestock control gate assembly, including a gate movable between a first position and a second position; power means connected to the gate for moving the gate; a sensing arm mounted on the gate for movement between a position spaced away from the gate and a position adjacent the gate; a roller mounted at the free end of the sensing arm; an adjusting arm pivotally mounted on the sensing arm; a flexible linkage having one end attached to the adjusting arm and the other end adapted to be rolled up by the roller; a pivotally-mounted lever adapted to be moved by the linkage as the linkage is rolled up by the roller; a switch disposed to be actuated by movement of the lever; the linkage connected to the adjusting arm adjacent one end thereof and passing along the arm so that the effective end of the linkage is at the other end of the arm from the connection, the adjusting arm disposed to be pivoted by contact with the gate when the sensing arm is adjacent to the gate, pivoting of the adjusting arm causing the linkage to lift from the arm so that the effective end of the linkage is at its connection to the arm and the effective length of the linkage is increased thereby.

References Cited

UNITED STATES PATENTS

| | | | |
|---|---|---|---|
| 459,007 | 9/1891 | La Porte | 49—262 X |
| 2,124,342 | 7/1938 | Brase | 49—262 |
| 2,217,852 | 10/1940 | Anderson | 49—31 X |
| 2,668,203 | 2/1954 | Martin | 200—61.41 |
| 2,732,200 | 1/1956 | Demosthenes | 49—263 X |
| 3,180,950 | 4/1965 | Jacobsen | 200—61.41 |
| 3,197,620 | 7/1965 | Peltier | 200—61.41 X |

DAVID J. WILLIAMOWSKY, *Primary Examiner.*

DENNIS L. TAYLOR, *Assistant Examiner.*

U.S. Cl. X.R.

49—264; 200—61.41